United States Patent [19]
Balderson et al.

[11] Patent Number: 5,885,324
[45] Date of Patent: Mar. 23, 1999

[54] METHOD FOR THE PRODUCTION OF SYNTHETIC RUTILE

[75] Inventors: Graham F.. Balderson, Montreal, Canada; Charles A. MacDonald, Samsonvale, Australia

[73] Assignee: Tiomin Resources, Inc., Montreal, Canada

[21] Appl. No.: 708,037

[22] Filed: Aug. 30, 1996

[30] Foreign Application Priority Data

Jul. 26, 1996 [CA] Canada ................................. 2182123

[51] Int. Cl.⁶ ............................................. C01G 23/053
[52] U.S. Cl. .................. 75/435; 75/433; 75/414; 75/392; 75/743; 75/711; 420/477
[58] Field of Search ........................... 75/435, 433, 414, 75/392, 743, 711; 420/477

[56] References Cited

U.S. PATENT DOCUMENTS

| | | | |
|---|---|---|---|
| 3,660,029 | 5/1972 | Naguib | 23/202 |
| 3,739,061 | 6/1973 | Stickney et al. | 423/610 |
| 3,777,013 | 12/1973 | Soverini et al. | 423/610 |
| 3,859,077 | 1/1975 | Othmer | 75/1 |
| 4,085,190 | 4/1978 | Shiah | 423/80 |
| 4,097,574 | 6/1978 | Auger et al. | 423/74 |
| 4,158,041 | 6/1979 | Tolley | 423/80 |
| 4,175,952 | 11/1979 | Tolley | 75/101 |
| 4,199,522 | 4/1980 | Rado | 423/83 |
| 4,225,564 | 9/1980 | Tolley | 423/81 |
| 4,629,607 | 12/1986 | Gueguin | 423/74 |
| 5,389,355 | 2/1995 | Gueguin | 423/610 |
| 5,427,749 | 6/1995 | Hollitt et al. | 423/74 |

FOREIGN PATENT DOCUMENTS

| | | | |
|---|---|---|---|
| 1084669 | 9/1980 | Canada . | |
| 1288577 | 12/1987 | Canada | C01G 23/04 |
| 1329006 | 12/1987 | Canada | C22B 034/12 |
| 1239018 | 7/1988 | Canada | C22B 7/04 |
| 2077441 | 3/1991 | Canada . | |
| 2101078 | 11/1992 | Canada | C01B 7/07 |
| 2116275 | 2/1994 | Canada | C01G 23/47 |

Primary Examiner—Patrick Ryan
Assistant Examiner—M. Alexandra Elve
Attorney, Agent, or Firm—Sokol Law Office

[57] ABSTRACT

Synthetic Rutile is prepared from raw ilmenite ore by a method comprising activating ilmenite and subjecting it to a multi-stage countercurrent leaching process in hot hydrochloric acid.

11 Claims, 2 Drawing Sheets

OVERALL SCHEMATIC FLOWSHEET

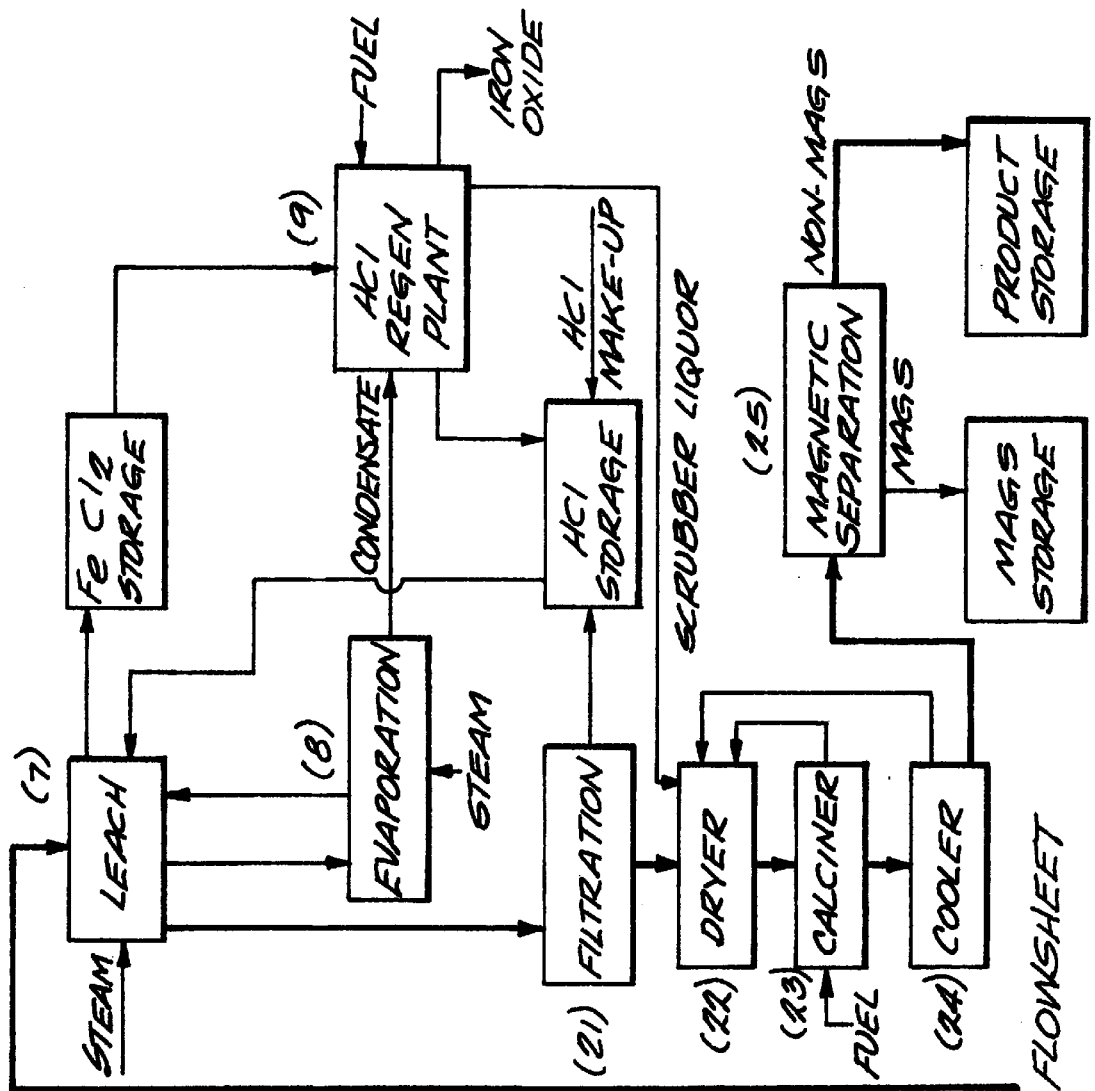

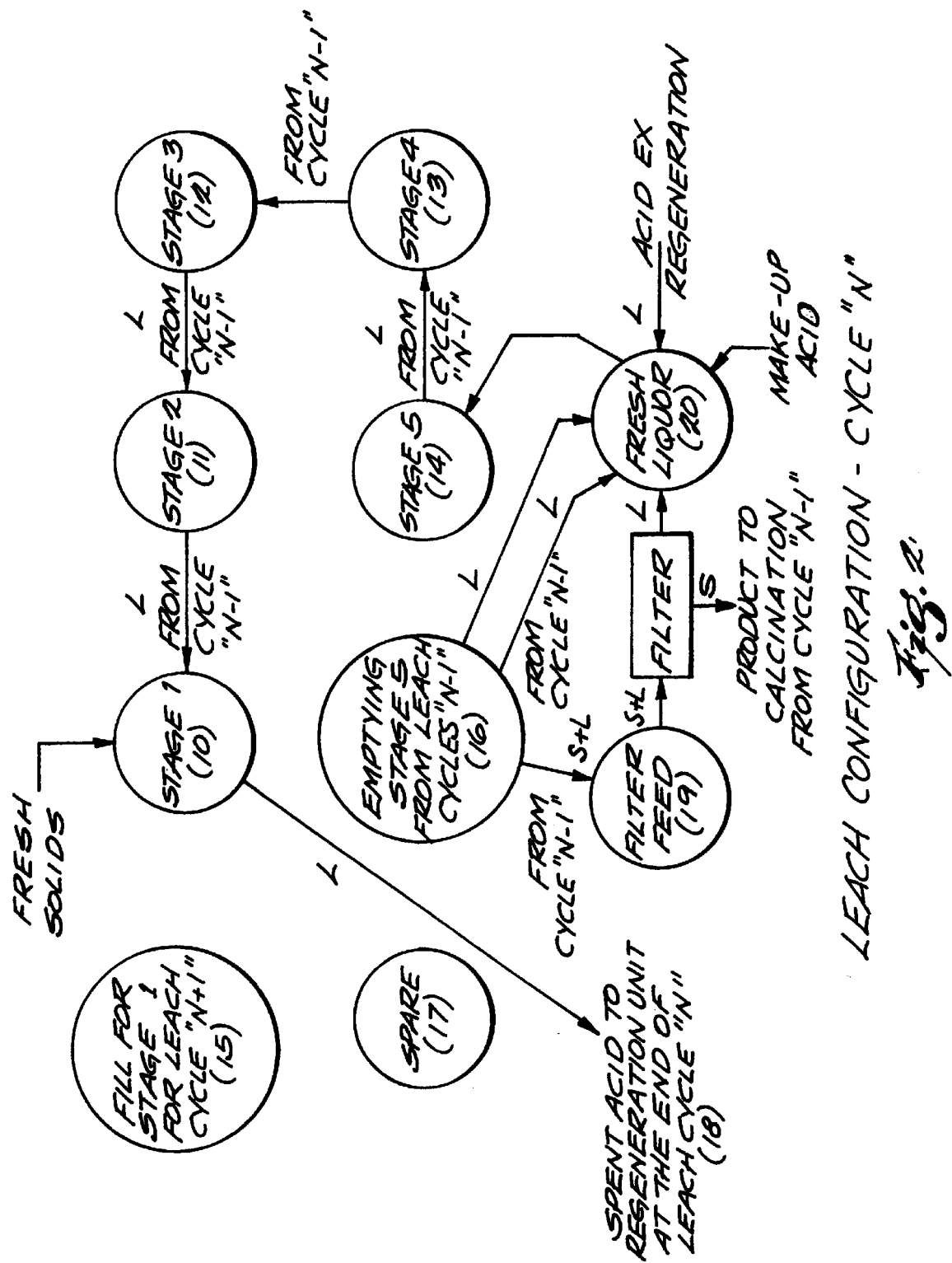

METHOD FOR THE PRODUCTION OF SYNTHETIC RUTILE

The present invention relates to a method for the production of Synthetic Rutile from an ore containing iron and titanium, for example, ilmenite ore, and it particularly pertains to a process where leaching takes place in fluidised leach columns.

BACKGROUND OF THE INVENTION

Processes for the production of Synthetic Rutile from ore such as ilmenite are becoming increasingly important. Synthetic Rutile is frequently used in place of natural rutile, of which only limited deposits remain, for the production of titanium tetrachloride, which is the starting material for the production of titanium dioxide.

In order to obtain high grade titanium dioxide from titaniferous ores such as ilmenites, it is necessary to remove a substantial portion of the iron values therefrom. In commercial operations, partial removal of iron values is usually achieved from a thermo-reduction or electro-smelting treatment of the titaniferous ore which reduces the iron to a metallic state thus making it easily removable from the titanium values. Once the iron is removed, a concentrate containing titanium values is recovered. This concentrate is generally referred to as titaniferous slag. Typically, this slag contains approximately 88% by weight titanium values, 10% iron values and less than 2% manganese values. Additionally, the slag contains impurities.

Other processes have been commercially developed which may overcome some of the problems frequently encountered, however they are limited in their application to particular grades of ilmenite such as the Becher process or are more complicated and less economical than is desirable such as the Benilite process. Some other processes which claim to have wide application and improved economics, such as the Murso and ERMS processes have been proposed but have not yet reached the stage of commercial development.

SUMMARY OF THE INVENTION

Accordingly, an object of the present invention is to provide a method for producing Synthetic Rutile which regenerates hydrochloric acid from the ferrous chloride and other metal chlorides resulting from the process.

Ilmenite ore can be converted to a substantially iron free Synthetic Rutile by a multi-step procedure which incorporates controlled oxidation/reduction and acid leaching. Specifically, it has been discovered that by taking the activated ilmenite leaving the reduction process and subjecting it to leaching in hot hydrochloric acid, the iron content can be substantially removed leaving a residue which contains about 95% titanium dioxide.

More specifically the ilmenite ore is first oxidised and then reduced in two or three fluidised bed stages. The reduced sample then proceeds to a multi-stage leaching process taking place in fluidised leaching columns using hot hydrochloric acid, and involving one or two evaporation steps. Finally, the product is subjected to filtration, calcination and magnetic separation.

In accordance with another object of the present invention there is provided a method of processing ore containing iron and titanium to produce Synthetic Rutile, said method comprising the steps of: a) oxidation and reduction in fluidised beds; b) a multi-stage leaching process using hot hydrochloric acid in fluidised leaching columns; c) followed by filtration, calcination and magnetic separation of the leach residue and regeneration of the hydrochloric acid.

A further object of the present invention is to provide a method of leaching which, following a reduction process, subjects an activated ore, such as ilmenite, to multi stages of leaching in hot hydrochloric acid, in fluidised leaching columns in a countercurrent configuration, and which incorporates one or two evaporation stages. The core of this present invention is the concept whereby the solids remain in the one leach column throughout the whole process while the liquor is advanced in a coutercurrent fashion through the leach process.

The present invention has been proven to provide especially good results in the production of Synthetic Rutile from ilmenite ore, results which could not prior to the present invention be achieved as easily or efficiently.

Further objects and advantages of the present invention will be apparent from the following description, reference being made to the accompanying drawings wherein preferred embodiments of the invention are clearly shown.

BRIEF DESCRIPTION OF THE DRAWINGS

The present invention will be further understood from the following description with reference to the drawings in which:

FIG. 1 illustrates an overall schematic flowsheet detailing the method for manufacturing Synthetic Rutile, including the leaching stage.

FIG. 2 illustrates a flow chart detailing the multi-stage leaching process.

DETAILED DESCRIPTION OF THE DRAWINGS

As illustrated in FIG. 1, the method for manufacturing Synthetic Rutile begins with the ilmenite ore 3 being first oxidised 4, then reduced 5, in two or three fluidised bed stages. The oxidation reaction oxidises virtually all the present ore to the ferric state, according to:

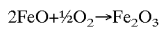
$$2FeO + \tfrac{1}{2}O_2 \rightarrow Fe_2O_3$$

This reaction is carried out with air between 750° and 1000° C. in a single stage fluidised bed reactor.

The reduction reaction, which takes place in one or two stages of fluidised bed reactors, reduces the bulk of the ferric iron back to the ferrous state, according to:

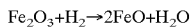
$$Fe_2O_3 + H_2 \rightarrow 2FeO + H_2O$$

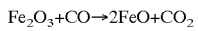
$$Fe_2O_3 + CO \rightarrow 2FeO + CO_2$$

The grain size of the particles leaving this stage of the process has been significantly reduced, which renders the solids amenable to removal of iron oxide via hydrochloric acid leaching. The reduction operation takes place at between 750° and 1000° C., in the presence of hydrogen and carbon monoxide gases, which are formed by the catalytic reforming of natural gas in an atmospheric (autothermal) reformer 6 or other means of achieving the same, according to:

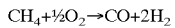
$$CH_4 + \tfrac{1}{2}O_2 \rightarrow CO + 2H_2$$

One of the ways of achieving this in practice could be as follows. A mixture of air and natural gas is preheated and fed to an autothermal reactor where the natural gas is reformed with the aid of a catalyst to produce a product containing 35% H$_2$ and 18% CO, which is sufficient for the reaction.

The activated ilmenite 2 leaving the reduction process and after cooling 1 is then subjected to leaching 7 in hot hydrochloric acid, to remove the predominant iron content, and other minor metals which are associated, as follows:

$$FeO + 2HCl \rightarrow FeCl_2 + H_2O$$

This process leaves a residue analyzing about 95% titanium dioxide (TiO$_2$) after subsequent calcination 23 and magnetic separation 25 as analyzed by x-ray fluorescence (XRF) analysis.

As illustrated in FIG. 2, the leaching process takes place in multi stages, in a countercurrent configuration. There are several reasons for the countercurrent leach. First, fresh activated ilmenite contacts leach liquor with a high concentration of FeCl$_2$ and low concentration of HCL. This prevents dissolution of titanium dioxide, and the consequent formation of fines via hydrolysis. Second, almost spent acid contacts fresh activated ilmenite prior to passing to the hydrochloric acid regeneration plant. This ensures that the liquor sent to the acid regeneration plant is low in free hydrochloric acid, thus saving capital and operating costs in the hydrochloric acid regeneration plant. Third, fresh hydrochloric acid having a strength of about 19.9% contacts solids with a low iron content, thereby ensuring maximum purity of Synthetic Rutile produced.

The multi-stage leaching process proceeds as follows: In Stage 1 (10) fresh activated ilmenite is reacted with weak acid, having a strength of between 2.0 to 6.0% HCl to reduce the concentration of acid in the spent liquor to about 0.03% HCL. Stages 2 (11), 3 (12) and 4 (13) are the heart of the process. The acid falls in strength from about 18.8% to 19.9% entering Stage 4 (13) to about 2.5% to 6.0% leaving Stage 2 (11). Stage 2 (11) and 3 (12) incorporate evaporation in order to maintain a high concentration of acid and other solubles chlorides. In Stage 5 (14), an acid wash is used to displace soluble impurities.

It is intended that the process take place in hybrid batch continuous mode, in that the solids remain in a single leach column, while the liquor advances in a countercurrent direction. Solids enter a single vessel and remain there until the process is complete. Liquor moves around the circuit, passing through the multi stages of leaching. In a typical commercial plant, at any one time therefore, there could be five columns each containing a full load of solids, at different stages of leaching. In practice, once again in a typical commercial plant, there are eight vessels provided. In addition to the multi stages in the process, there is one stage filling 15 with liquor, one stage emptying 16 and one stage spare 17.

The partially leached ilmenite lacks some of the mechanical strength of the original ilmenite. Accordingly, the leaching is conducted in fluidised leaching columns in order to avoid the shear forces which may be introduced through the use of agitators. This also minimises attrition of the particles and also results in a reduction in the quantity of fines generation from the chemical reactions. The fluidised approach effectively combines the agitated leach stage and the solid/liquid separation stage required to achieve a countercurrent leach.

A proposed leach vessel is designed so that the superficial liquor velocity in the fluidised zone is about 4 mm/s, which is sufficient to achieve a small bed expension. Above the fluidised zone, the vessel flares in order to offer a zone of reduced velocity, at about 2 mm/s, to constrain the bed to the fluidised zone. Since the particle density diminishes as the process proceeds, it is possible that the fluidising velocity may be reduced as the process approaches completion. Recirculating pumps have variable frequency drives for this purpose. The top settling section of the vessel is provided with a flare angled so that the material depositing on the flared section can slide off back into the bed. Furthermore, the distribution plate of the fluidised bed column is designed so that solids will settle out rather than flow back through the distribution plate when flow stops. The distribution plate itself is in the form of an inverted cone so fabricated so that the column can be completely drained of solids.

It is proposed that the leach vessels be constructed of polyvinylidene fluoride dual laminate although they can be made of a number of suitable materials. This lining offers total protection against hot hydrochloric acid, while simultaneously possessing abrasion resistant and non-stick properties which are suitable to this application.

Due to the batch nature of the process, sufficient conveyors must be provided in order to permit the feeding of activated ilmenite to any of the eight leach columns.

A typical initiation of Stage 1 (10) of any leach run occurs as follows: any particular empty column is filled or partially filled to its overflow level with liquor from completion of a previous Stage 2 (11) leach, the reduced ilmenite is then introduced by adding the prescribed amount to the column with any overflow from the column recirculating back to the tank holding the previous Stage 2 (11) liquor; finally the leach is commenced by pumping liquor from the previous Stage 2 (11) holding tank through the column with the overflow recirculating back to the same holding tank. The leach liquor is pumped in this closed circuit arrangement for a specified time interval or until the ferrous iron concentration in the recirculating liquor has reached a predetermined level at which time the pump is stopped and excess liquor is drained from the column to the previous Stage 2 (11) liquor holding tank down to a level just above the settled partially leached solids in the column. The liquor so collected in the previous stage 2 (11) holding tank is then transferred to the acid regeneration plant 18 for conversion to hydrochloric acid and metal oxides residues.

The leaching of the solids remaining in the column continues at Stage 2 (11) by pumping liquor from a previous Stage 3 (12) storage tank through the column for a predetermined time interval or until the liquor overflowing from the column has reached a predetermined ferrous iron concentration. Such time interval would typically be constant for all stages of the leaching process. At the predetermined time, the pump would be stopped and excess liquor in the column would be allowed to drain into the previous Stage 3 (12) storage tank which now becomes the Stage 2 (10) liquor for a succeeding leach run.

The above procedure is repeated at each stage of the leach until the final stage where the leach liquor pumped around in close circuit is a combination, in any proportion, of regenerated acid, fresh make-up acid and liquor recovered from the filtering step in the process. This combination would usually constitute a leach liquor containing between 18 and 20% hydrochloric acid by weight. The process would also work successfully with acid concentrations outside of the usual range and, in particular, if these acid concentrations were greater than 20% by weight.

At the conclusion of the final leaching stage, the valve on the bottom of the leaching column is opened and the liquor and solids remaining in the column at that time are discharged into a holding tank prior to filtration. It may also be necessary to pump liquor into the column while the column is being discharged to ensure complete discharge of the solids.

A typical five stage leaching process therefore proceeds as follows: In Stage 1 (10) freshly reduced ilmenite is reacted with a weak acid and metal chloride solution to reduce the acid concentration of the spent liquor to 0.03 to 0.04% HCl. Stage 2 (11), 3 (12) and 4 (13) are the heart of the process. The acid concentration falls in strength from about 18.8 to 19.9% entering Stage 4 (13) to 2.5 to 6.0% leaving Stage 2 (11). Either or both Stages 2 (11) and 3 (12) incorporates evaporation in order to maintain acid and metal chloride concentrations at a high level. Typical soluble iron concentration in the above five stage process range from 180 to 184 gms/liter leaving Stage 1 (10), with 140 to 163 gms/liter leaving Stage 2 (11), to 3 to 5 gms/liter entering Stage 4 (13). While the above acid and soluble iron concentrations are typical of the five stage process, other concentrations are possible depending upon, inter alia, the number of Stages employed, the iron content of the ilmenite feed, the strengths of the fresh acid make-up and of the regenerated acid.

An upstream classifier may be provided prior to filtration in order to remove fines from the process which may cause agglomeration in the final product. The classifier, which operates in a similar manner as the leach columns, is sized to remove particulate material with a diameter of less than 45 μm.

Reverting back to FIG. 1, an evaporation step 8 may be incorporated to stage 2 (11) or stage 3 (12) alone or both, for two key reasons. First, the capital and operating costs of the hydrochloric acid regeneration plant 9 are minimised if the concentration of $FeCl_2$ in the feed to the regeneration plant is optimised. Second, the rate of reaction in the leach process is enhanced by maintaining the acid strength in the middle of the process at about 16% or higher. As the overall function of the evaporation step 8 is to maintain acid and chlorine iron strength in the leach circuit, and to eliminate water produced by the chemical reactions from the circuit, a flash evaporator has been proposed. While this cannot achieve the same product strength as can a fractionating column with condenser and reboiler, it is capable of achieving the desired result at a minimum capital and operating cost. The principle of the flash evaporation operation is that hot dilute $FeCl_2$/HCl solution is sprayed into a partially evacuated vessel. The liquid cools as a portion of the water, together with some of the HCl evaporates. The concentrated bottoms product is pumped from the flash vessel, reheated and returned to the process. The evaporated vapour passes to a barometric condenser, which comprises a cylinder where cool water is sprayed. The water absorbs the HCl vapour and the cooling effect maintains the vacuum. A weak HCl solution is pumped to the HCl regeneration plant 9 where it is used for HCl adsorption purposes.

The final leach residue can be separated from the slurry either by centrifugation or by filtration 21. Centrifugation is likely to give good results, but as these devices cannot be fabricated from plastics, the need for exotic materials of construction could make centrifugation a high capital cost option. On the other hand the material filters well, and any filter which is able to be entirely fabricated from hydrochloric acid resistant materials, would be a suitable candidate. However, a vacuum belt filter of suitable capacity is proposed for the duty.

Following the leaching process, the residue is dried 22 at a low heating rate and passed to calcination 23. The calcination process operates at between 750° and 1200° C. in a fluidised bed calciner or a kiln which is used in order to reduce abrasion of the material. The process uses a countercurrent rotary dryer or a fluidised bed, in order to limit the heating of the material as it passes through the dryer, at temperature below 200° C. or a fluidised bed or a kiln. The calcined product is further subjected to cooling 24 and a one or two-stage magnetic separation 25 in magnetic separation drums or rolls, to remove unreacted silicate materials, some of which contain unwanted chromium and partially unreacted ilmenite particles.

The spent liquor from the leaching process, which contains ferrous chloride or other metal chlorides, together with residual hydrochloric acid, passes to the hydrochloric acid regeneration plant 9, where the solution is treated to regenerate hydrochloric acid and to reject the iron oxide as hematite and other metals as their oxides, via a pyrohydrolysis reaction. The process takes place at up to 1000° C. either in a fluidised bed or spray roaster. The major difference between the fluidised bed process and the spray roasting process is in the physical form of the metal oxide residue. In the fluidised bed process, the metal oxides are produced in the form of dense, pelletised particles, while the spray roasting process produces metal oxides in the form of fine particulates, which must be subjected to physical agglomeration prior to further processing or disposal.

Description of the Results

| Time Elapsed (minutes): | | 0 | 230 | 363 | 503 |
|---|---|---|---|---|---|
| Analysis | $SiO_2$ | 1.78% | 1.87% | 2.34% | 2.49% |
| | $Al_2O_3$ | 0.64% | 0.70% | 0.51% | 0.38% |
| | $Fe_2O_3$ | 46.91% | 39.67% | 10.49% | 1.04% |
| | MgO | 0.51% | 0.55% | 0.22% | 0.00% |
| | CaO | 0.79% | 0.32% | 0.23% | 0.09% |
| | $K_2O$ | 0.02% | 0.02% | 0.03% | 0.03% |
| | $TiO_2$ | 46.71% | 54.49% | 85.41% | 95.72% |
| | MnO | 2.52% | 2.29% | 0.57% | 0.02% |
| | $P_2O_5$ | 0.07% | 0.04% | 0.10% | 0.11% |
| | $Cr_2O_3$ | 0.02% | 0.02% | 0.06% | 0.03% |
| | $V_2O_5$ | 0.00% | 0.00% | 0.00% | 0.00% |
| | $ZrO_2$ | 0.03% | 0.04% | 0.04% | 0.08% |

As can be seen from the above results, the remaining residue contains a high titanium dioxide content at 95.72% after some 503 minutes of processing.

The invention may be embodied in other specific forms without departing from the spirit or essential characteristics thereof. The present embodiments are therefore to be considered as illustrative and not restrictive, the scope of the invention being indicated by the appended claims rather than by the foregoing description, and all changes that come within the meaning and range of equivalency of the claims are therefore intended to be embraced therein.

The embodiments of the invention in which an exclusive property or privilege is claimed are defined as follows:

1. Method of leaching which, following a reduction process, subjects an activated ore, such as ilmenite, to multiple stages of leaching in hot hydrochloric acid, in fluidized leaching columns in a countercurrent configuration, and which incorporates one or more evaporation stage, said evaporation stage occurring during the countercurrent configuration and separately from the fluidised leaching columns, said evaporation stage eliminating water produced by the chemical reactions occurring in the leaching process and maintaining the acid concentration at an elevated level.

2. Method of claim 1 wherein the leaching process is a hybrid batch/continuous operation where the solids remain in a single leach column, while the liquor advances in a countercurrent direction, and the evaporation stage occurs in the middle of the leaching process.

3. Method of claim 1 wherein stage 1 consists of reacting the fresh activated ore, such as ilmenite, with weak acid and a metal chloride solution to reduce the acid concentration of the spent liquor to about 0.03 to 0.04% HCl.

4. Method of claim 3 wherein the acid is 2.5 to 6% in strength.

5. Method of claim 1 wherein said evaporation stage occurs after stage 2 or 3, or both, of said multi-stage leaching process in order to maintain a high concentration of acid and chlorine irons.

6. Method of claim 5 wherein the evaporation is carried out using a flash evaporator.

7. Method of claim 1 wherein the last stage incorporates a hydrochloric acid wash to displace soluble impurities.

8. Method of claim 1 wherein acid falls in strength from about 18.8 to 19.9% entering stage 4 to about 2.5 to 6.0% leaving stage 2.

9. Method of claim 1 wherein up to eight leach vessels are utilised, one for each of the five stages in the process as well as one for filling with liquor, one emptying, and one as a spare.

10. Method of claim 1 wherein an upstream classifier removes fines which may cause agglomeration.

11. Method of claim 10 wherein the upstream classifier is sized to remove particulate material with a diameter of less than 45 $\mu$m.

* * * * *